US008190901B2

(12) United States Patent
Barr et al.

(10) Patent No.: US 8,190,901 B2
(45) Date of Patent: May 29, 2012

(54) LAYERED SECURITY IN DIGITAL WATERMARKING

(75) Inventors: John Kennedy Barr, Tigard, OR (US); Brett A. Bradley, Portland, OR (US); Brett T. Hannigan, Portland, OR (US); Adnan M. Alattar, Tigard, OR (US); Robert Durst, Fort Meyers, FL (US)

(73) Assignee: Digimarc Corporation, Beaverton, OR (US)

( * ) Notice: Subject to any disclaimer, the term of this patent is extended or adjusted under 35 U.S.C. 154(b) by 454 days.

(21) Appl. No.: 10/449,827

(22) Filed: May 29, 2003

(65) Prior Publication Data

US 2004/0039914 A1 Feb. 26, 2004

Related U.S. Application Data

(63) Continuation-in-part of application No. 10/158,385, filed on May 29, 2002.

(51) Int. Cl.
*H04L 9/00* (2006.01)
*H04L 9/32* (2006.01)
*G06K 9/00* (2006.01)

(52) U.S. Cl. .......... 713/176; 713/186; 726/17; 382/115; 382/116; 382/117; 382/118; 382/119; 382/124

(58) Field of Classification Search .................. 713/176, 713/182, 186, 200
See application file for complete search history.

(56) References Cited

U.S. PATENT DOCUMENTS

| 5,337,361 A | 8/1994 | Wang et al. |
| 5,469,506 A | 11/1995 | Berson et al. |
| 5,471,533 A | 11/1995 | Wang et al. |
| 5,499,294 A | 3/1996 | Friedman |
| 5,505,494 A | 4/1996 | Belluci et al. |
| 5,606,609 A | 2/1997 | Houser et al. |
| 5,617,119 A | 4/1997 | Briggs et al. |
| 5,635,012 A | 6/1997 | Belluci et al. |
| 5,646,997 A | 7/1997 | Barton |
| 5,659,726 A | 8/1997 | Sandford et al. |
| 5,664,018 A | 9/1997 | Leighton |
| 5,721,788 A | 2/1998 | Powell et al. |

(Continued)

FOREIGN PATENT DOCUMENTS

EP 493091 7/1992

(Continued)

OTHER PUBLICATIONS

Jain et al, Hiding a Face in a Fingerprint Image, 2002, IEEE, pp. 756-759.*

(Continued)

*Primary Examiner* — Aravind Moorthy

(57) ABSTRACT

A media object authentication system uses layers of security features based on digital watermarks embedded in media objects. The system generates a first digital watermark with a message payload carrying data about the object, such as a hash of text data printed on the object. The first digital watermark is combined with a content signature derived from features of the media object, such as frequency domain attributes, edge attributes, or other filtered version of the media signal (e.g., image photo on a secure document) on the media object. This combination forms a new digital watermark signal that is embedded in the host media object. Biometric information may also be embedded in a machine readable code in the object or indexed via the machine readable code. This biometric information is used to generate biometric templates, and facilitate or enhance biometric comparison for one to one or one to many verification.

42 Claims, 4 Drawing Sheets

U.S. PATENT DOCUMENTS

| | | | |
|---|---|---|---|
| 5,740,244 A | 4/1998 | Indeck et al. | |
| 5,767,496 A | 6/1998 | Swartz et al. | |
| 5,768,426 A | 6/1998 | Rhoads | |
| 5,787,186 A * | 7/1998 | Schroeder | 382/115 |
| 5,799,092 A | 8/1998 | Kristol et al. | |
| 5,815,252 A | 9/1998 | Price-Francis | |
| 5,825,892 A | 10/1998 | Braudaway et al. | |
| 5,838,814 A | 11/1998 | Moore | |
| 5,841,886 A | 11/1998 | Rhoads | |
| 5,889,868 A | 3/1999 | Moskowitz et al. | |
| 5,933,798 A | 8/1999 | Linnartz | |
| 5,951,055 A | 9/1999 | Mowry, Jr. | |
| 5,974,548 A | 10/1999 | Adams | |
| 5,995,630 A | 11/1999 | Borza | |
| 6,024,287 A * | 2/2000 | Takai et al. | 235/493 |
| 6,064,764 A | 5/2000 | Bhaskaran et al. | |
| 6,065,119 A | 5/2000 | Sandford, II et al. | |
| 6,095,566 A * | 8/2000 | Yamamoto et al. | 283/75 |
| 6,101,602 A | 8/2000 | Fridrich | |
| 6,104,812 A | 8/2000 | Koltai et al. | |
| 6,105,010 A | 8/2000 | Musgrave | |
| 6,122,403 A | 9/2000 | Rhoads | |
| 6,131,162 A | 10/2000 | Yoshiura et al. | |
| 6,141,438 A * | 10/2000 | Blanchester | 382/140 |
| 6,185,316 B1 | 2/2001 | Buffam | |
| 6,205,249 B1 | 3/2001 | Moskowitz | |
| 6,208,746 B1 | 3/2001 | Musgrave | |
| 6,209,092 B1 | 3/2001 | Linnartz | |
| 6,215,421 B1 | 4/2001 | Kondo et al. | |
| 6,233,347 B1 | 5/2001 | Chen et al. | |
| 6,233,684 B1 | 5/2001 | Stefik et al. | |
| 6,240,121 B1 * | 5/2001 | Senoh | 375/130 |
| 6,243,480 B1 | 6/2001 | Zhao et al. | |
| 6,246,777 B1 | 6/2001 | Agarwal et al. | |
| 6,269,169 B1 | 7/2001 | Funk et al. | |
| 6,272,634 B1 | 8/2001 | Tewfik et al. | |
| 6,275,599 B1 | 8/2001 | Adler et al. | |
| 6,285,775 B1 | 9/2001 | Wu et al. | |
| 6,286,761 B1 | 9/2001 | Wen | |
| 6,292,092 B1 * | 9/2001 | Chow et al. | 340/5.6 |
| 6,320,829 B1 | 11/2001 | Matsumoto et al. | |
| 6,332,031 B1 | 12/2001 | Rhoads et al. | |
| 6,332,193 B1 * | 12/2001 | Glass et al. | 713/170 |
| 6,370,258 B1 | 4/2002 | Uchida | |
| 6,389,151 B1 | 5/2002 | Carr et al. | |
| 6,401,206 B1 * | 6/2002 | Khan et al. | 713/176 |
| 6,421,450 B2 | 7/2002 | Nakano | |
| 6,425,081 B1 | 7/2002 | Iwamura | |
| 6,430,306 B2 | 8/2002 | Slocum et al. | |
| 6,442,432 B2 * | 8/2002 | Lee | 607/59 |
| 6,463,416 B1 | 10/2002 | Messina | |
| 6,487,301 B1 | 11/2002 | Zhao | |
| 6,490,355 B1 | 12/2002 | Epstein | |
| 6,496,933 B1 | 12/2002 | Nunally | |
| 6,499,105 B1 | 12/2002 | Yoshiura et al. | |
| 6,504,941 B2 | 1/2003 | Wong | |
| 6,512,837 B1 | 1/2003 | Ahmed | |
| 6,532,541 B1 | 3/2003 | Chang et al. | |
| 6,533,385 B1 | 3/2003 | Mackay et al. | |
| 6,546,112 B1 | 4/2003 | Rhoads | |
| 6,560,339 B1 | 5/2003 | Iwamura | |
| 6,574,350 B1 | 6/2003 | Rhoads et al. | |
| 6,577,336 B2 | 6/2003 | Safai | |
| 6,597,745 B1 | 7/2003 | Dowling | |
| 6,611,599 B2 | 8/2003 | Natarjan | |
| 6,611,607 B1 | 8/2003 | Davis et al. | |
| 6,614,914 B1 | 9/2003 | Rhoads et al. | |
| 6,636,615 B1 | 10/2003 | Rhoads et al. | |
| 6,671,407 B1 | 12/2003 | Venkatesan et al. | |
| 6,671,806 B2 * | 12/2003 | Lenoir et al. | 713/193 |
| 6,683,966 B1 | 1/2004 | Tian | |
| 6,694,041 B1 | 2/2004 | Brunk | |
| 6,701,304 B2 | 3/2004 | Leon | |
| 6,714,683 B1 | 3/2004 | Tian | |
| 6,748,533 B1 * | 6/2004 | Wu et al. | 713/176 |
| 6,751,336 B2 | 6/2004 | Zhao | |
| 6,757,406 B2 | 6/2004 | Rhoads | |
| 6,763,121 B1 * | 7/2004 | Shaked et al. | 382/100 |
| 6,775,777 B2 * | 8/2004 | Bailey | 713/186 |
| 6,776,438 B2 | 8/2004 | Lee | |
| 6,778,678 B1 * | 8/2004 | Podilchuk et al. | 382/100 |
| 6,778,682 B2 | 8/2004 | Rhoads | |
| 6,779,024 B2 | 8/2004 | DeLaHuerga | |
| 6,782,116 B1 | 8/2004 | Zhao et al. | |
| 6,785,815 B1 * | 8/2004 | Serret-Avila et al. | 713/176 |
| 6,788,800 B1 | 9/2004 | Carr et al. | |
| 6,801,907 B1 * | 10/2004 | Zagami | 707/3 |
| 6,804,373 B1 | 10/2004 | Tresser et al. | |
| 6,804,378 B2 | 10/2004 | Rhoads | |
| 6,804,779 B1 * | 10/2004 | Carroni et al. | 713/176 |
| 6,856,977 B1 | 2/2005 | Adelsbach et al. | |
| 6,920,437 B2 * | 7/2005 | Messina | 705/76 |
| 6,940,995 B2 | 9/2005 | Choi et al. | |
| 6,983,057 B1 * | 1/2006 | Ho et al. | 382/100 |
| 7,209,571 B2 | 4/2007 | Davis et al. | |
| 7,224,820 B2 | 5/2007 | Inomata et al. | |
| 7,366,908 B2 | 4/2008 | Tewfik | |
| 2001/0000045 A1 * | 3/2001 | Yu et al. | 707/9 |
| 2001/0008557 A1 | 7/2001 | Stefik et al. | |
| 2001/0024510 A1 | 9/2001 | Iwamura | |
| 2001/0025342 A1 * | 9/2001 | Uchida | 713/186 |
| 2001/0034835 A1 | 10/2001 | Smith | |
| 2001/0037455 A1 | 11/2001 | Lawandy et al. | |
| 2001/0040977 A1 | 11/2001 | Nakano | |
| 2001/0055390 A1 | 12/2001 | Hayashi et al. | |
| 2001/0056410 A1 | 12/2001 | Ishigaki | |
| 2002/0009208 A1 | 1/2002 | Alattar et al. | |
| 2002/0009209 A1 * | 1/2002 | Inoue et al. | 382/100 |
| 2002/0010826 A1 | 1/2002 | Takahashi et al. | |
| 2002/0016916 A1 | 2/2002 | Natarajan | |
| 2002/0021824 A1 | 2/2002 | Reed et al. | |
| 2002/0030907 A1 | 3/2002 | Ikeda et al. | |
| 2002/0031240 A1 | 3/2002 | Levy et al. | |
| 2002/0037093 A1 | 3/2002 | Murphy | |
| 2002/0046171 A1 * | 4/2002 | Hoshino | 705/43 |
| 2002/0049908 A1 | 4/2002 | Shimosato et al. | |
| 2002/0054355 A1 | 5/2002 | Brunk | |
| 2002/0056041 A1 | 5/2002 | Moskowitz | |
| 2002/0059255 A1 | 5/2002 | Wu | |
| 2002/0061121 A1 | 5/2002 | Rhoads et al. | |
| 2002/0064298 A1 | 5/2002 | Rhoads et al. | |
| 2002/0067844 A1 | 6/2002 | Reed et al. | |
| 2002/0076048 A1 | 6/2002 | Hars | |
| 2002/0076082 A1 | 6/2002 | Arimura et al. | |
| 2002/0080959 A1 | 6/2002 | Weller | |
| 2002/0095577 A1 | 7/2002 | Nakamura et al. | |
| 2002/0095579 A1 | 7/2002 | Yoshiura et al. | |
| 2002/0096562 A1 | 7/2002 | Lewis | |
| 2002/0099943 A1 | 7/2002 | Rodriguez et al. | |
| 2002/0105665 A1 | 8/2002 | Wasilewski et al. | |
| 2002/0105679 A1 | 8/2002 | Haynes | |
| 2002/0112163 A1 | 8/2002 | Ireton | |
| 2002/0114458 A1 | 8/2002 | Belenko et al. | |
| 2002/0116509 A1 | 8/2002 | DeLaHuerga | |
| 2002/0120870 A1 | 8/2002 | Susaki et al. | |
| 2002/0122567 A1 | 9/2002 | Kuzmich et al. | |
| 2002/0122568 A1 | 9/2002 | Zhao | |
| 2002/0136459 A1 * | 9/2002 | Imagawa et al. | 382/218 |
| 2002/0146123 A1 | 10/2002 | Tian | |
| 2002/0176114 A1 | 11/2002 | Zeller et al. | |
| 2002/0178363 A1 | 11/2002 | Ambrogio et al. | |
| 2002/0178368 A1 | 11/2002 | Yin et al. | |
| 2002/0184505 A1 | 12/2002 | Mihcak et al. | |
| 2002/0199106 A1 | 12/2002 | Hayashi | |
| 2003/0006277 A1 * | 1/2003 | Maskatiya et al. | 235/379 |
| 2003/0011684 A1 | 1/2003 | Narayanaswami et al. | |
| 2003/0059124 A1 | 3/2003 | Center, Jr. | |
| 2003/0065924 A1 | 4/2003 | Wuidart et al. | |
| 2003/0084809 A1 | 5/2003 | Goh et al. | |
| 2003/0088774 A1 | 5/2003 | Hars | |
| 2003/0089764 A1 * | 5/2003 | Meadow et al. | 235/375 |
| 2003/0091218 A1 * | 5/2003 | Hamid | 382/124 |
| 2003/0097568 A1 | 5/2003 | Choi | |
| 2003/0099374 A1 | 5/2003 | Choi et al. | |
| 2003/0102365 A1 * | 6/2003 | Elderfield | 235/375 |
| 2003/0103645 A1 | 6/2003 | Levy et al. | |
| 2003/0112974 A1 | 6/2003 | Levy | |

| | | | |
|---|---|---|---|
| 2003/0126121 | A1 | 7/2003 | Khan et al. |
| 2003/0159043 | A1 | 8/2003 | Epstein |
| 2003/0161470 | A1 | 8/2003 | Shin et al. |
| 2003/0161496 | A1* | 8/2003 | Hayashi et al. ............... 382/100 |
| 2003/0218328 | A1* | 11/2003 | Conwell ........................ 281/31 |
| 2003/0220804 | A1* | 11/2003 | Wilson et al. ..................... 705/1 |
| 2004/0091050 | A1 | 5/2004 | Choi et al. |
| 2004/0093349 | A1* | 5/2004 | Buinevicius et al. ...... 707/104.1 |
| 2004/0133582 | A1 | 7/2004 | Howard et al. |
| 2004/0243567 | A1 | 12/2004 | Levy |
| 2005/0001419 | A1 | 1/2005 | Levy et al. |
| 2005/0036656 | A1 | 2/2005 | Takahashi |
| 2005/0054355 | A1 | 3/2005 | Saitou et al. |

FOREIGN PATENT DOCUMENTS

| | | |
|---|---|---|
| EP | 629972 | 12/1994 |
| EP | 0 736 860 | 10/1996 |
| EP | 838050 | 4/1998 |
| EP | 0 996 278 | 4/2000 |
| EP | 1041815 | 10/2000 |
| EP | 1096429 | 5/2001 |
| EP | 1173001 | 1/2002 |
| EP | 1209897 | 5/2002 |
| GB | 2362240 | 11/2001 |
| WO | WO0062258 | 10/2000 |
| WO | WO0172030 | 9/2001 |
| WO | WO0173997 | 10/2001 |
| WO | WO-02/39714 | 5/2002 |
| WO | WO 0237309 | 5/2002 |
| WO | WO 02056264 | 7/2002 |
| WO | WO 02059712 | 8/2002 |
| WO | WO-2005/060152 | 6/2005 |

OTHER PUBLICATIONS

Jain et al, Hiding Biometric Data, 2003, IEEE, pp. 1494-1498.*
Hashimoto et al, Personal Identification Based on Both Facial Images and Watermarking Techniques in Network Environment, 2004, IEEE, pp. 1029-1033.*
Fridrich, "Visual Hash for Oblivious Watermarking," Proc. SPIE Security and Watermarking of Multimedia Contents, pp. 286-294, Jan. 2000.
Mobasseri et al, "Content-dependent video authentication by self-watermarking in color space," SPIE, Security and Watermarking of Multimedia Contents III, vol. 4314, pp. 35-44, Jan. 2001.
Liu et al, "Content-based watermarking model," 15th Int'l Conf on Pattern Recognition, ICPR-2000, vol. 4, pp. 238-241, Sep. 2000.
Queluz et al, "Spatial watermark for image verification," SPIE, Security and Watermarking of Multimedia Contents II, vol. 3971, pp. 120-130, Jan. 2000.
Bassali et al., "Compression Tolerant Watermarking for Image Verification," IEEE Proc. Int Conf. on Image Processing, vol. 1, Sep. 2000 pp. 434-437.
Dittmann et al., "Content-based Digital Signature for Motion Pictures Authentication and Content-Fragile Watermarking," IEEE Proc. Int. Conf. on Multimedia Computing and Systems, Jun. 1999, pp. 209-213.
Dittmann, "Chapter 3: Telltale Watermarking," In Multiresolution Digital Watermarking: Algorithms and Implications for Multimedia Signals, Ph.D. thesis at Univ. of Toronto, 1999, pp. 23-52.
Frequently Asked Questions, Epson Image Authentication System (IAS), Oct. 5, 1999, 3 pages.
Lamy et al., "Content-Based Watermarking for Image Authentication," Proc. 3.sup.rd Int. Workshop on Information Hiding, Sep./Oct. 1999, pp. 187-1898.
Lin et al., "Generating Robust Digital Signature for Image/Video Authentication," Proc. Multimedia and Security Workshop at ACM Multimeida'98, Sep. 1998, pp. 49-54.
Lin et al., "Issues and Solutions for Authenticating MPEG Video," Proc. SPIE vol. 3657: Security and Watermarking of Multimedia Contents, Jan. 1999, pp. 54-65.
Queluz et al., "Spatial Watermark for Image Verification," Proc. SPIE vol. 3971: Security and Watermarking of Multimedia Contents II, Jan. 2000, pp. 120-130.
Rey et al., "Blind Detection of Malicious Alterations on Still Images using Robust Watermarks," Proc. IEE Seminar on Secure Images and Image Authentication, Apr. 2000, pp. 7/1-7/6.
Schneider, "A Robust Content Based Digital Signature for Image Authentication," Proc. IEEE Int. Conf. on Image Processing (vol. III), Sep. 1996, pp. 227-230.
Sun et al., "VQ-based digital signature scheme for multimedia content authentication," Proc. SPIE vol. 3971: Security and watermarking of Multimedia Contents II, Jan. 2000, pp. 404-416.
Tian, "Wavelet-Based Image Compression and Content Authentication," Oct. 22, 2001, Proc. SPIE Int. Soc. Opt. Eng, vol. 4551, pp. 11-20.
Tian, "Wavelet-Based Reversible Watermarking for Authentication," Proc. SPIE—Int. Soc. Opt. Eng., vol. 4675, 2002, pp. 679-690.
Xie et al., "Methods for Soft Image/Video Authentication," Proc. Conf. of ATIRP (Advanced Telecommunications and Information Distribution Research Project), Mar. 2000, 5 pages.
Xie et al., "Secure MPEG Video Communications by Watermarking," Proc. Conf of ATIRP (Advanced Telecommunications and Information Distribution Research Panel), Feb. 1999, pp. 459-462.
Barreto et al., Toward secure public-key blockwise fragile authentication watermarking, 2002, IEEE, pp. 57-62.
Bender et al., Applications for Data Hiding, IBM Systems Journal, vol. 39, Nos. 384, 2000, pp. 547-568.
Braudaway et al., "Application of Invisible Image Watermarks to Produce Remotely Printed, Duplication Resistant, and Demonstrably Authentic Documents," Proc. SPIE-Int. Soc. Opt. Eng. vol. 4314, pp. 351-359.
Chai Wah Wu, On the Design of Content-Based Multimedia Authentication Systems, 2002, IEEE, pp. 385-393.
Communication of Postal Information Using Two-Dimensional Symbols, Draft Under Implementation, Mar. 19, 1998, 21 pages.
Final Office Action on U.S. Appl. No. 10/158,385, mailed Dec. 26, 2007.
Final Office Action on U.S. Appl. No. 10/158,385, mailed Jun. 5, 2006.
Friedman, "The Trustworthy Digital Camera: Restoring Credibility to the Photographic Image," IEEE Trans. Consumer Electronic vol. 39, No. 4, Nov. 1983, pp. 905-910.
International Search Report for PCT/US03/17048, mailed Jul. 8, 2008.
Lefebvre et al., A Robust Soft hash Algorithm for Digital Image Signature, 2003, IEEE, pp. 495-498.
Matthews, "When Seeing is not Believing," New Scientist, No. 1895, Oct. 16, 1993, pp. 13-15.
Memon et al., Protecting digital media content, 1998, Association for Computing Machinery, pp. 34-43.
Mishra, Preeti, "Biometrics, Smart Card Help Curb Cyber Crime," The Hindu, Feb. 26, 2003, 2 pages.
NCITS-WI 990124 Is 13660 Proof, 1997, 30 pages.
Non-Final Office Action on U.S. Appl. No. 10/158,385, mailed Jan. 23, 2007.
Non-Final Office Action on U.S. Appl. No. 10/158,385, mailed Dec. 9, 2005.
Non-Final Office Action on U.S. Appl. No. 10/158,385, mailed Jun. 9, 2008.
Non-Final Office Action on U.S. Appl. No. 10/158,385, mailed Jul. 10, 2007.
Non-Final Office Action U.S. Appl. No. 10/158,385, mailed Sep. 9, 2004.
Notice of Allowance on U.S. Appl. No. 10/158,385, mailed Oct. 1, 2008.
Satonaka, Takami, "Biometric Watermark Authentication with Multiple Verification Rule," University of Proceedings of the 2002 IEEE Signal Processing Society Workshop, 2002, pp. 597-606.
Szepanski, "A Signal Theoretic Method for Creating Forgery-Proof Documents for Automatic Verification," Proc. IEEE 1979 Carnahan Conf. on Crime Countermeasures, May 1979, pp. 101-109.
U.S. Appl. No. 60/180,364, Davis et al., filed Feb. 4, 2000.
U.S. Appl. No. 60/198,138, Alattar, filed Apr. 17, 2000.
U.S. Appl. No. 60/198,857, Davis et al., filed Apr. 21, 2000.
Van Schyndel et al., "Towards a Robust Digital Watermark," Second Asia Conf. on Computer Vision, Dec. 5, 1995, pp. 504-508.

Walton, "Image Authentication for a Slippery New Age," Dr. Dobb's Journal, Apr. 1995, pp. 18-20, 22, 24, 26, 82, and 84-87.

Wu et al., "Data Hiding in Digital Binary Image," 2000 IEEE, pp. 393-396.

Yeung et al., "An Invisible Watermarking Technique for Image Verification," Proc. Int. Conf. on Image Processing, vol. 1, pp. 680-683, Oct. 1997.

Yeung et al., "Digital Watermarks: Shedding Light on the Invisible," 1998 IEEE, pp. 32-41.

Non-Final Office Action on U.S. Appl. No. 12/422,715, mailed Jun. 23, 2011.

Notice of Allowance on U.S. Appl. No. 10/449,827, mailed Jan. 9, 2012.

* cited by examiner

LAYERED SECURITY IN DIGITAL WATERMARKING

RELATED APPLICATION DATA

This patent application is a continuation in part of U.S. patent application Ser. No. 10/158,385, filed May 29, 2002, which is hereby incorporated by reference.

TECHNICAL FIELD

The invention relates to digital watermarking and authentication of media objects.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 6,122,403, which are hereby incorporated by reference.

One application of digital watermarking is for the authentication of physical and electronic media objects, like images, video, audio, and printed media. There are a variety of ways to authenticate these objects. One way is to embed a predetermined watermark in the object. If a reader detects this watermark in an object, then the detection of the watermark is an indicator of its authenticity.

Another way to authenticate the object is to embed information about the object or the bearer of the object (e.g., in photo ID or other secure documents). If the reader extracts this information from the watermark, and it matches information on the object or about the bearer, then the comparison this information is an indicator that object is authentic and/or the bearer of the object is valid.

To undermine the authentication function of the digital watermark, a hacker might try to re-create the watermark in a fake media object.

This disclosure describes a method for authenticating electronic or physical media objects using digital watermarks.

This disclosure describes a method for creating a media object for authentication. This method computes a hash of information on the object, and generates a pattern from the hash. It also computes a content signature from a media signal in the media object. It then combines the content signature and the pattern to form a content dependent pattern. Finally, the method embeds the content dependent pattern as a digital watermark into the media object.

One specific application of this method is to create secure documents that may be authenticated automatically. For example, the media object may comprise a photo ID or other secure document, where the hash is computed from data on the document and the content signature is derived from features of the photo or other image on the document. The method applies to other physical and electronic media objects. The hash may be computed from information in the media object, which is easily interpreted by a viewer or listener of the rendered object, or may be computed from information relating to the media object.

This disclosure also describes a related method of authenticating a media object using a digital watermark embedded in the media object. This authentication method providing a first pattern, either from an external source (e.g., user input, system memory, etc.) or derived from a digital watermark embedded in the object. The method also derives a content dependent signature from a media signal in the media object. It then combines the content dependent signature and the first pattern to form a content dependent pattern. Finally, it measures the content dependent pattern embedded as a digital watermark in the media signal to provide a measurement of authenticity of the media signal.

One aspect of the invention is a method for creating an identification document having a biometric image. This method identifies a feature location in the biometric image, generates a digital watermark signal, and embeds the digital watermark signal in the biometric image such that the digital watermark location is dependent on the feature location.

Another aspect of the invention is a method of creating an identification document having an image. This method generates a first digital watermark signal that carries a variable message payload including information related to information located on the identification document separate from the image. It also generates a second digital watermark signal that carries an image signature of the image. It then embeds the first and second digital watermark signals in the image.

Another aspect of the invention is a method of creating an identification document having a biometric image. This method derives biometric information from the biometric image, derives an image signature separate from the biometric image, and generates a variable digital watermark message including the biometric information. The method embeds a digital watermark in the biometric image such that the digital watermark is dependent on the image signature and carries the variable digital watermark message.

Another aspect of the invention is a method of authenticating an identification document. This method extracts biometric information from a machine readable code embedded in the identification document, and uses the biometric information to generate a biometric template of the bearer of the identification document from a live image captured of the bearer or from a document image captured of a facial image printed on the identification document. It then performs a biometric verification using the biometric template.

Another aspect of the invention is a method of performing biometric analysis. The method extracts biometric information from a machine readable code embedded in an identification document. It uses this biometric information to facilitate comparison of biometric information derived from a document image captured of a facial image printed on the identification document with either biometric information derived from a live image captured of the bearer or biometric information stored in a biometric database. The method determines validity of the identification document based on the comparison.

Yet another aspect of the invention is a method of performing biometric analysis. This method extracts biometric search enhancement information from an identification document. It uses the biometric search enhancement information to facilitate a search of a biometric database, and determines validity of the identification card based on the search of the biometric database.

Further features will become apparent with reference to the following detailed description and accompanying drawings.

DETAILED DESCRIPTION

Figure 1:
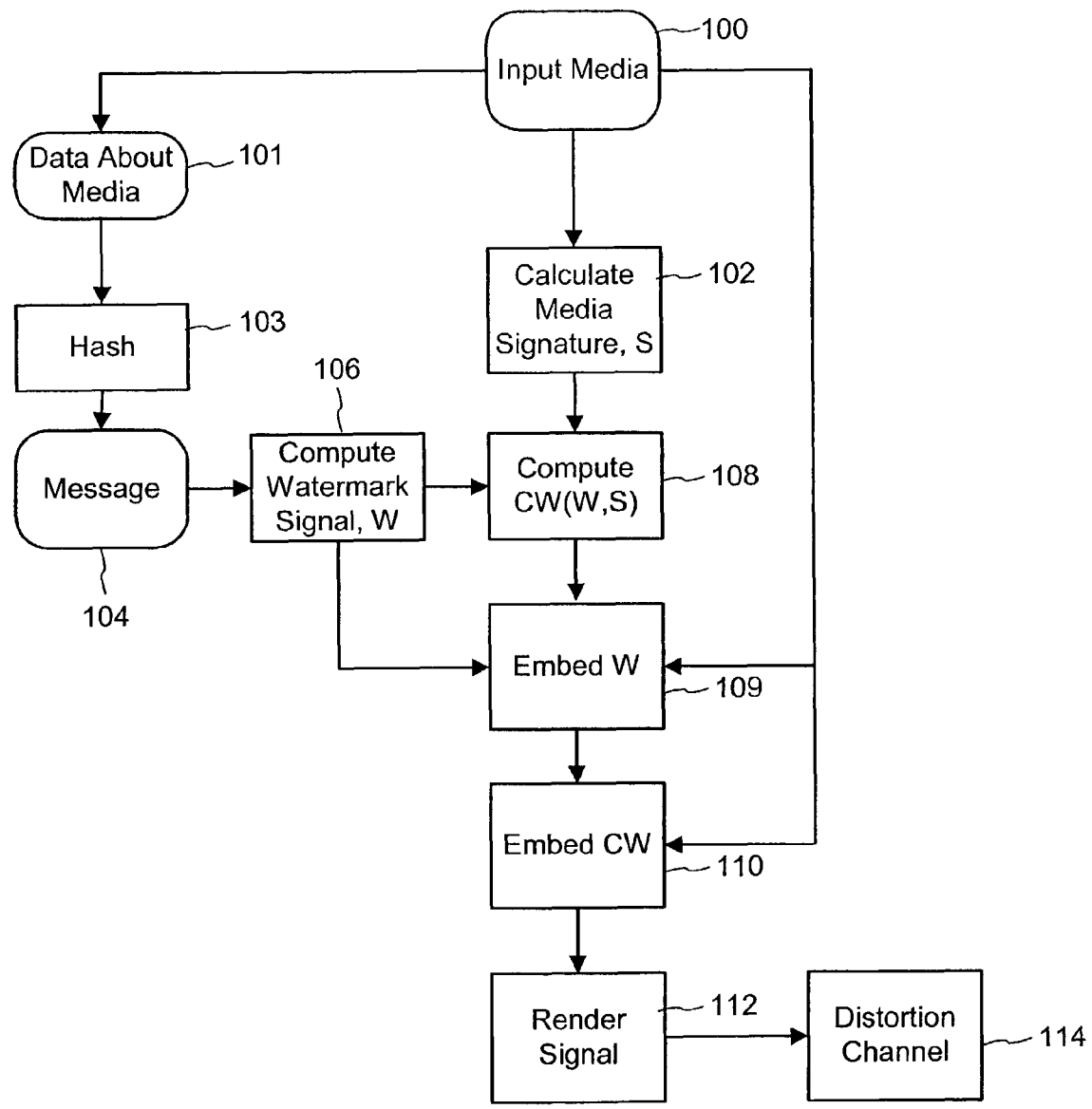
FIG. 1 is a diagram illustrating a digital watermarking embedder used to create watermarked objects that are authenticated in multiple ways.

FIG. 1 is a diagram illustrating a digital watermarking embedder used to create watermarked objects that are authenticated in multiple ways. This diagram shows a variety of techniques to provide layers of security in a media object. The implementer may choose to use one or more combinations of the elements illustrated in the diagram, such as a hash carried in a watermark, a content dependent watermark, a content signature carried in a watermark, etc. We will illustrate how these functions of the digital watermark may be integrated into a single watermark or in separate digital watermarks. While the media object generally encompasses images, video, audio, and physical objects, we illustrate the method through the use of examples of security documents that carry images embedded with digital watermarks.

As shown in FIG. 1, the input to the embedder is an input media signal 100. In our example of a security document, this input signal corresponds to an image to be printed on the security document.

Figure 2:
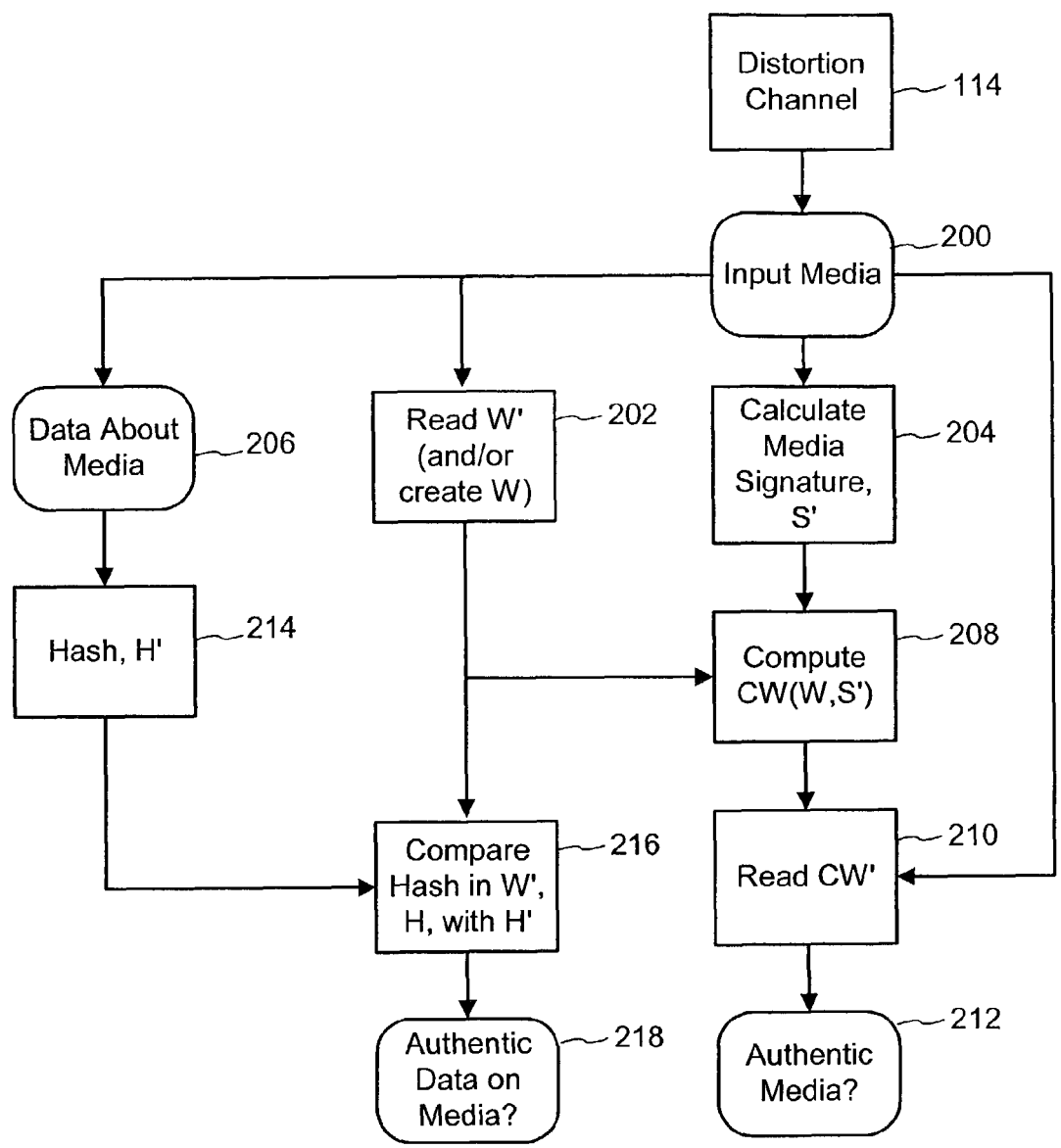
FIG. 2 is a diagram illustrating a method for authenticating media objects created using the method shown in FIG. 1.

The embedder computes a signature of the media object (102) by calculating a set of features of the media signal in the media object. Preferably, the features are selected such that they are likely to be relatively unchanged through a distortion channel that the object is expected to pass through. In the example of a security document, this distortion channel includes printing, scanning (to capture a digital image for authentication as shown in FIG. 2), normal wear and tear, soiling, geometric distortion, etc. The features and robustness of the digital watermarks may be adapted to survive or degrade in response to distortions that result from intentional manipulation. For example, if an intentional manipulation occurs, such as scanning and re-printing of a security document on a desktop scanner/printer, this manipulation may render the feature severely distorted and/or the digital watermark un-readable, which serve as indicators that the document is a fake. A plurality of digital watermarks and signal feature metrics may be used to measure evidence of such manipulation. These metrics may be used along with robust digital watermarks that carry additional authentication information as described below.

Examples of features from which the signature are derived for an image include: edge pixels detected using an edge detection filter, frequency coefficients (e.g., low frequency coefficients of blocks in the image), relationships among neighboring pixels (e.g., differences between neighboring pixel values, computed using a filter that returns the difference or sign of the difference between a pixel and the average of its neighbors), etc. In one implementation, we use these features to generate a binary antipodal signal of [1, −1] corresponding to locations within the signal to be watermarked. The antipodal signal is a vector where the elements having a value of 1 represent a location of the feature (or location where feature meets a criteria, such as above a threshold, local maxima/minima), while the −1 represents absence of the feature (or location where the feature does not meet the criteria).

The antipodal signal can be used to embed features of the host input signal into the digital watermark, such as selected low frequency coefficients. In one implementation, for example, the embedder calculates the signature by taking a frequency transform (e.g., a Discrete Cosine Transform) of an M by M block of the host image signal, and then quantizing the lowest frequency N by N coefficients (except DC) to 1 or −1 by performing a threshold comparison with their median value (greater than median assigned to 1, and less than median assigned to −1). This results in a binary antipodal signature of length (N×N−1), whose elements are mapped to the M×M locations in the original M by M block. Note that N is less than M, so the elements of the signature are redundantly mapped to the M×M samples in the M by M block. A similar procedure is repeated for other M by M blocks of the host media signal.

Next, the embedder computes a content dependent watermark, CW, as a function of the signature and a basic watermark pattern, W (108). Like the signature, this basic watermark pattern is also a binary antipodal signal in our implementation. The embedder generates CW by performing a pointwise multiplication of W and CW. Other functions may be used to generate CW from W and S, and the resulting signal need not be a binary antipodal signal.

As shown in FIG. 1, the basic pattern, W, can also serve as an additional security layer. In particular, the basic pattern may be used to carry information about the media or an entity associated with the media, such as its owner, the bearer of a security document, etc. In the specific case of a security document, the system includes an OCR reader to capture text information carried on the document about the bearer, such as name, birthdate, address, ID number, etc. In the embedder of FIG. 1, this data about the media object (101) is input to a hash function (103), which generates a hash. For example, in our secure document example, this text information is input to a hash function, such as a CRC or secure hash, like MD5, SHA, etc This hash then forms part of a digital watermark payload message (104).

The embedder converts the payload into the basic pattern (106). The process of generating a basic pattern from the payload can be implemented in a variety of ways, and depends in part on the message coding process compatible with the digital watermark embedder. For example, some digital watermark embedders operate on binary signals, while others operate on M-ary symbols. One approach is to apply repetition and error correction coding to generate an intermediate signal from the payload, then spread the intermediate signal over a binary antipodal carrier signal using binary or M-ary spread spectrum modulation. The result is a binary antipodal signal that carries the payload and is mapped to locations within the host media object.

The basic pattern may be integrated with a calibration signal or used in conjunction with a separate calibration watermark to compensate for geometric/temporal distortion such as geometric/temporal scaling, shear, rotation, shifting, cropping, etc. For example, the carrier, in one implementation, is formed into a pattern that has a certain set of transform domain peaks that enable geometric synchronization by performing pattern matching between the peaks and a reference signal.

In one implementation, the embedder separately embeds the basic pattern and the content dependent watermark using separate digital watermark embedding operations 109, 110. One example for a secure document is where the basic pattern is embedded by modifying host image pixels at a first resolution up or down according to the sign of the corresponding binary antipodal signal element. The content dependent pattern is then embedded similarly, but at a different spatial resolution. Both the basic pattern and the content dependent pattern are embedded throughout the image and overlap. In an alternative example, the basic and content dependent patterns are embedded at the same spatial resolution, but at mutually exclusive spatial locations (e.g., in interleaved pixel blocks). In general, the two watermarks are layered so as to minimize their interference; this can be achieved by embedding in discrete spatial or transform domain features, locations, etc. As opposed to a simple binary quantization of a host signal value up or down, the host signal values or features corresponding to the watermark elements may be quantized to pre-determined bins or levels that adapt to host signal characteristics corresponding to the watermark element value. Also, the watermark embedders may employ additional perceptual modeling to control the amount of variation to the host signal based on data hiding attributes of the host signal as measured using Human Perceptual Modeling.

In another implementation, the embedder embeds only the content dependent watermark (110), and it serves the dual function of binding the watermark to the host signal through its content dependency attribute, and carrying other authentication information, such as the hash and a database pointer to a database entry storing information about the media object or the bearer of that object. One example of this approach is to invert the basic pattern only in selected locations corresponding to the signature (e.g., where the signature has a value of −1).

In yet anther implementation, the embedder embeds only the basic pattern (109), but does so using a content dependent quantization-based digital watermarking function, where the values of host signal elements are quantized into one of two sets of quantization bins, one corresponding to symbol 1 and another to symbol −1 of the binary antipodal signal. Alternatively, vector quantization may be employed in cases where the basis pattern is coded in the form of M-ary symbols. Each possible M-ary symbol corresponds to a corresponding set of quantization bins. To embed the basic pattern, the host signal values corresponding to elements in the basic pattern are quantized into the closest bin of the set corresponding to the symbol at that location in the basic pattern.

Returning generally to the process of FIG. 1, the embedder creates a digitally watermarked signal. In typical applications, this watermarked signal is rendered (e.g., printed or otherwise converted to analog form) (112). In our example of the security document, the security document is printed and distributed to the bearer. As noted above, the media object then travels through a distortion channel (114), which occurs due to its use in the intended application.

FIG. 2 is a diagram illustrating a method for authenticating media objects created using the method shown in FIG. 1. At various points in the use of the media object, there are many instances where applications demand automated verification of the object's authenticity, including whether the object itself is authentic, whether its bearer or owner is correct, etc. The layered security features implemented with the digital watermark enable such verification. In the case of secure documents, this authentication may be for access control to a place, facility, database, financial transaction, device, network system, etc. The verification process may be overt, such as where a bearer of a document is required to submit the document to a digital image scanner for verification. The verification process may also occur covertly, such as when a digital object passes through a node or gateway in a network, and is authenticated. Consider a case where the bearer of a credit card presents his credit card to a web camera to facilitate a financial transaction on the Internet. An image captured on the card can be processed at a security gateway server, where the digital image of the credit card is transmitted for digital watermark decoding and feature analysis.

As shown in FIG. 2, the process begins with a digital version of the media object 200, which is captured from its analog form or received in digital form. The specific operation varies depending on the implementation of the embedder system.

As a first example, consider the case in which both the basic pattern, W, and the content dependent watermark, CW, are embedded. In the example of secure document captured by a digital camera or scanner, there is likely to be geometric distortion and cropping. As such, the detector uses the calibration signal to synchronize with the basic pattern W. The detector then reads estimates of the basic pattern elements, W', e.g., using a reader compatible with the digital watermark embedder (202). In our implementation, the reader applies a non-linear filter compatible with the embedder to characteristics of the media signal to estimate the values of the embedded pattern, W. It then performs de-modulation and error correction decoding to recover the payload, including the embedded hash, H. An error detection message in the payload may also be used to verify that that the payload has been recovered, error-free.

After getting the payload, the reader reconstructs the pattern, W, using the same technique as in the embedder.

In another processing thread or function, the verification system calculates the media signature, S', (204) in the same manner as in the embedder. One of the benefits of using the calibration signal is that it enables the input signal to be calibrated (e.g., geometrically/temporally aligned) before the signature is calculated. This aspect of the system provides greater flexibility and reliability to the signature calculation.

Next, the system computes CW as a function of W (or W') and S' (208). The notation {CW', W' and S'} refers to the fact that these vectors may not be identical to their counterparts in the embedder. A compatible digital watermark reader then extracts estimates of CW (210) from the media object, which is preferably calibrated before extraction of CW. The degree to which CW can be extracted provides a first metric of authenticity. This measurement can be made by computing a correlation measure, and specifically, by a correlation measure between the extracted CW in block 210 and CW computed in block 208.

The measure of the content dependent pattern can be optimized by normalizing or adapting it to media signal from which it is measured. In one embodiment, the detector is programmed to normalize the measure of correlation for CW by the strength of the extracted watermark, W', detected in the media signal (e.g., the digital image scanned from a printed object being authenticated). By normalizing the measure of CW relative to the measurement of W', the verification system achieves better differentiation of authentic and fake objects. Specifically, the strength of W' can be used to set a more effective threshold for the measurement of CW in certain cases.

In the measurement of CW, there are two sources of error: 1. the error between the original and re-computed signature in the received media signal; and 2 the error in extracting the watermark CW from the received media signal. In one implementation for printed images where the embedder inserts W and CW as primary and secondary watermarks at mutually exclusive locations in the host image and at the same spatial resolution in the host image, the measurement of the strength of the primary watermark W provides a reliable predictor for the measurement of the secondary watermark. The detector uses the strength of the primary watermark to set thresholds for the measurements of the secondary watermark that specify which measurements of the secondary watermark are deemed to be attributable to an authentic object and which are attributable to a fake. The rules for setting thresholds are preferably predetermined based on empirical studies using statistical distributions of signatures from authentic and fake host signals. Experiments show that the separation between the distributions of the measurement of CW in originals and fakes gets stronger as the strength of the primary watermark gets stronger. As these distributions separate from each other, the thresholds indicating where fakes/authentic originals can be reliably distinguished widen as well. Based on tests on training sets, the implementer programmatically determines candidate thresholds for a particular value of strength of the primary watermark. Then, during operation of the verification system, the detector adapts the threshold for CW based on the strength of W by selecting the appropriate thresholds as a function of W.

Further experiments show that differentiation between originals and fakes can be enhanced in cases where there is more bandwidth for embedding CW. In images, for example, the bandwidth for CW can be increased for a fixed amount of perceptibility of the digital watermark by increasing the amount of image data in which CW is embedded. One specific example is increasing the image area over which CW is embedded. This increase can be achieved by spreading and/or repeating the CW pattern over more image samples.

In addition, separation between originals and fakes can be increased by using a longer signature. The effect of using a longer signature is that it will be embedded less redundantly in the watermark that carries the content dependent pattern. Specifically, for a fixed number of samples of the host media signal that are modified to embed CW, the redundancy of the signature decreases as the length of the signature increases.

The hash provides another layer of security. In our continuing example of a secure document, the personal information of the bearer on the secure document, generally referred to as data about media 206, is input to the same hash function used in the embedder 214, to create H'. This personal data may include name, address, date of birth, height, weight, eye color, etc. This hash is then compared with the hash extracted from W in block 216. The result is another indicator of authenticity (218), and in this example, indicates whether the personal information on the document has been altered. Even in the case where CW cannot be extracted, this measurement provides another indicator of authenticity.

The combination of the signature with the basic watermark provides an extra layer of security against photo ID card fraud, where one might attempt to copy the watermark into his own photo and then place that photo along with a copy of the personal data from the authentic card on a fraudulent photo ID card. In this scenario, even if the hash in the watermark matches the hash of the data on the card, the content signature will likely be different, and the measurement of the content dependent watermark will indicate that the photo ID is a fake.

As noted above, there are alternative implementations of the system, corresponding to the alternatives described for the embedder above. One alternative is where the basic pattern is stored or otherwise securely communicated to the verification system in a manner other than in the digital watermark carried in the media object. This may be some other machine-readable code in the secure document (e.g., 2D bar code, magnetic stripe, etc.), for example, or simply pre-programmed into the verification system.

Another implementation is where the signature, S, is used to transform (e.g., invert) selected portions of the basic pattern to create CW, without using a separate watermark to carry W. Note this transformation may involve a simple inversion of the symbols, or a more sophisticated scrambling or transform of the symbols in the base pattern corresponding to the signature elements. In this case, the verification system calculates S', and then attempts to read W, with and without the transform used to create CW. The result of these two read operations are then compared, and should be drastically different if the media signal is valid, and closer if the media signal is invalid. The degree of separation that indicates that the media is not authentic is derived through testing on training sets of valid and invalid objects. The result is a threshold test for the degree of separation between the two measurements.

Another alternative is to use an embedding and reading scheme for W that is inherently content dependent. One such example is the quantization scheme outlined above. In this type of scheme, the attributes of the embedding scheme make it difficult to extract W from one authentic document or object and insert it in another document or object without knowledge of the embedding methodology.

There are a number of variations to the approaches described above. In one implementation, an approach described in U.S. patent application Ser. No. 09/503,881 and U.S. Pat. No. 6,122,403 is used to repeat the watermark in blocks or "tiles" in a digital watermark embedded in a host image on a photo identification document. In particular, the digital watermark for each block includes a calibration component, a variable payload component (e.g., for carrying bearer information stored or printed elsewhere on the identification document), and an image signature component derived from the tile. Information symbols conveying the variable payload and the image signature are modulated with a pseudorandom carrier signal and mapped to locations within the tile. The variable payload and image signature may be processed with error correction or repetition coding before being spread over the carrier signal.

To authenticate the document, the watermark detector first detects the calibration signal component and uses it to calibrate the document image for rotation and spatial scaling. It then uses the calibration signal to locate tile spatial locations of each tile and proceeds to demodulate the variable payload portion and image signature portion from estimates of the modulated carrier signal in the document image. The extracted image signature for each tile is compared with a re-computed image signature from the tile to validate the watermark. The part of the variable payload used to carry document information is compared with the document information to further authenticate the document.

Figure 3:
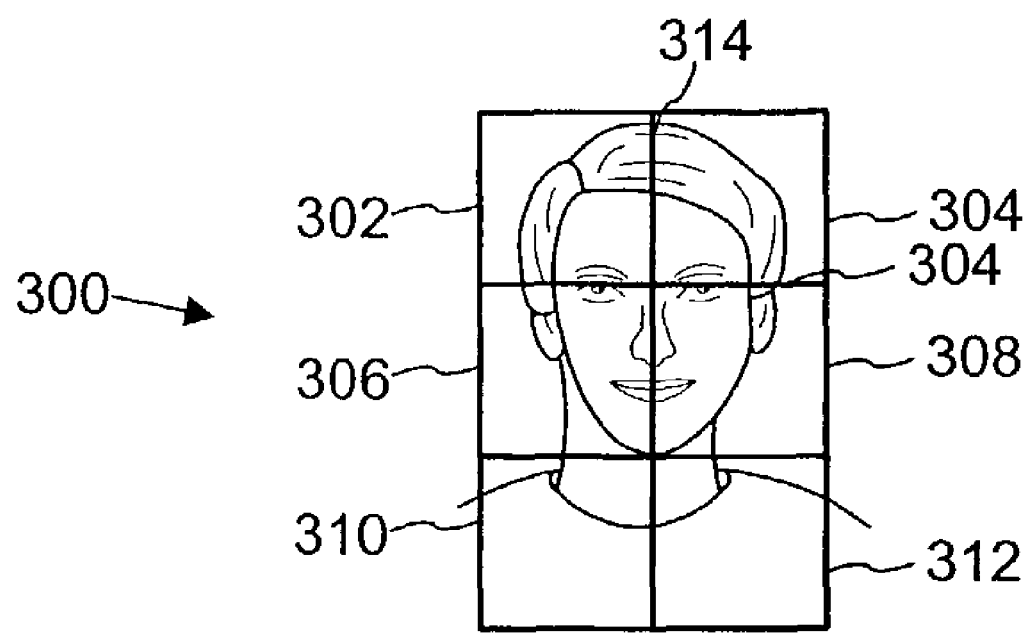
FIG. 3 is a diagram of a facial image for a photo identification document that has been tiled into blocks according to salient features for digital watermark embedding.

FIG. 3 illustrates an example of a host image 300 representing a photo to be printed on a photo identification document. This image is segmented into tiles 302-312. This approach enables the digital watermark embedder to compute a single signature for the entire host image, or a separate signature for each block. In the case where there is a separate signature per block, this signature may be embedded in the block from which it was computed, or another block.

One potential issue is the extent to which the modifications made to the host image due to the watermark embedding distort the value of the signature. This potential distortion can be avoided using an approach where the signature is computed for a first block (e.g., 302) and then embedded in a second, different block (e.g., 304) to produce a watermarked second block. Subsequently, the signature is computed for the watermarked second block (e.g., 304) and embedded in a third, different block (e.g., 306). This process is repeated, continuing with the third watermarked block (e.g., 306), and so on, until the entire host image is processed. The order of signature extraction and then embedding in another block may be along rows and columns, or according to some pseudorandom pattern as specified by a secret key.

On the detector side, the signature is recomputed for each block and compared with the extracted signature from the digital watermark in another block where that signature has previously been embedded.

Another variation of the method is to take advantage of the host image to make additional metrics for checking authenticity. In photo ID documents, for example, the photo image of a face has features that enable additional metrics. One such metric is the symmetry of facial features about a vertical axis (e.g., 314 in FIG. 3) defined by the center of the nose and mouth. To exploit this symmetry, the image can be divided into blocks along the left (302, 306, 310) and right (304, 308, 312) of this vertical axis of symmetry, and a signature can be chosen that is expected to be roughly equal for corresponding blocks at the same horizontal position, but on either side of the axis of symmetry. In this case, the similarity of the signatures in pairs of blocks along this axis provides another metric indicating whether the digital watermark has been swapped from another photo. In the case where the digital watermark is swapped, the resulting image (e.g., new face photo+estimated and copied watermark from another face photo on valid ID) is less likely to have embedded image signatures that satisfy the symmetry metric.

A related approach for exploiting attributes of the host image is to use the location of salient features like the eyes, nose and mouth as reference points for creating a coordinate system on the host image used in locating the digital watermark, or at least a portion of it. For example in the embedder, two axes are defined by salient features, such as a vertical axis defined by a line (e.g., 314) through the nose and mouth, and a horizontal axis (e.g., 316) through the two eyes. FIG. 3 provides an example of how the coordinate system is formed based on these two axes (314, 316) and the image is segmented into tiles (302-312) for embedding the digital watermark. Locations of these salient features can be found manually by user input, semi-automatically through a combination of user input and image analysis, or automatically through algorithms that locate the salient features using image analysis (e.g., image segmentation, edge detection and filtering, color analysis, local maxima or minima detection, morphological analysis, etc.) and/or analytical computations of feature locations based on accepted properties of human faces. Examples of these properties include basic assumptions, such as:

the height of the face, H, is some constant, k, times the width, W;
the width of the face is some constant, l, times the width of an eye, E;
the distance between the eyes is the width of an eye, E;
the center point between the eyes on the axis drawn between the eyes provides an intersection point where the vertical axis through the nose and mouth passes.

By locating the embedded digital watermark at some location or offset relative to the coordinate system origin defined by salient features, the digital watermark is further dependent on the attributes of the host image. As such, it is more difficult to copy from one image to another, and maintain this dependency accurately.

In one example implementation, the embedder computes a coordinate system based on the vertical axis 314 through the nose and mouth and horizontal axis through the eyes 316. The point of intersection of these two axes forms a reference point for locating the digital watermark, and more specifically, for locating tiles of the image that carry instances of a digital watermark signal. Each of these tiles can carry the same watermark, a different watermark, or different watermark signal components (some of which are the same per tile, and some that differ). One possible watermark signal protocol embeds the same watermark calibration signal in each tile, and a message payload that varies, at least in part, based on a varying image signature embedded per tile.

One compatible watermark detector for this protocol uses the calibration signal to detect the digital watermark and determine the rotation and scale of the image captured from a suspect photo identification document. Knowing this rotation and scale, the detector compensates for it and places the image into a reference orientation for further processing. For the sake of illustration, we refer to the image at the reference orientation as the "calibrated" image. It then uses the same process used in the embedder to identify salient features of the face (e.g., eyes, etc.), and tiles the image relative to the coordinate system established from the salient features. The detector then attempts to extract the digital watermark payload by reading the payload from image tiles. If the watermark payload is not able to be extracted accurately, then the image is deemed to be invalid. One way to check the validity of the payload is to include some fixed message symbols for comparison, and/or to user error detection, such as a CRC, on message symbols in the payload.

Another compatible watermark detector extracts the coordinate system of the watermark in two different ways and compares them to determine whether the image is valid. The first way is through the use of the calibration signal embedded in each tile to locate the origin of each tile, and thus, the coordinates system of the watermark signal over the entire image. One particular method correlates the phase specification of the calibration watermark with the suspect image to identify watermark block locations. The second way is through the use of salient features on the suspect image that has been calibrated for rotation and scale. If the location of the salient features has shifted relative to the watermark by more than a threshold, the detector deems the suspect image to be invalid.

Additional layers of security or variations may be applied. For example, some other host document or bearer specific information, such as the bearer's name, birth date, ID number, password (or other secret that the user knows), or biometric information, etc. may be used to specify the location of the digital watermark on the document, or more particularly, the coordinate system of the digital watermark tiles. This approach increases the hacker's difficulty in correctly embedding a digital watermark at the correct location. Generally speaking, user specific or document specific information may be used to locate the digital watermark in a user and/or document dependent location. Unless this relationship between watermark location and user or document information is maintained, the document is rendered invalid. As an example, the user or document specific information may be used to generate an offset, perhaps pseudo-randomly based on a secret key, to locate the digital watermark relative to a reference point. The reference point may be defined by salient features within an image on the document, or relative to a calibration signal on the document, either a hidden watermark calibration signal, or some other calibration signal (such as the border of the document, visible fiducial marking, text character location, etc.).

Approaches for locating the digital watermark relative to some reference location for authenticity are described in U.S. Patent Application Publication 2002-0099943, entitled Digital Watermarks For Checking Authenticity Of Printed Objects. Either the substrate or the image watermark may be embedded at predetermined locations relative to the other watermark or some visible fiducial on the object that can be detected automatically. Such a geometric relationship between the digital watermark and a fiducial, or between different digital watermarks is designed to be difficult to re-produce accurately in a copy of the object. To check authenticity, the watermark location is extracted and checked relative to the location of a second watermark or fiducial. If the relative positions of the watermark and fiducial/second watermark do not fall within a predetermined tolerance, the object is deemed to be a fake. The fiducial may be a simple visible pattern detectable by pattern recognition techniques, the edge of page, the border of text (e.g., margin of the page), or some other distinguishable structure.

Another layer of security is to make the digital watermark message dependent on salient features in the host content as described in published U.S. Patent Application Publication 2002-0009208, entitled Authentication Of Physical And Electronic Media Objects Using Digital Watermarks. For photographic images on identification documents, the salient features may be the location of the eyes, nose or mouth in the photo of the document holder, or the relative location of these features. This location data (e.g., coordinates or hash of the coordinates) can be converted into a numeric message, which is encoded into the watermark embedded in the photographic image. If the watermark is forged or copied into another image, then the content specific message in the watermark is unlikely to be within predetermined tolerances of the content specific message computed from the image.

The digital watermark may also carry biometric information (e.g., biometric template, or hash of template, etc.) or an index to a database entry where such information is stored. There are a variety of biometric information, including but not limited to: fingerprint, voice print, handwritten signature, iris image, retina image, facial recognition template or other facial features, hand print, etc. In the case of a photo identification document that includes a photo of the bearer's face, added security can be attained by including facial biometric information in the digital watermark, which is then embedded in the facial photo. Depending on the capacity of the digital watermark message, the message may include the facial biometric template, a hash of the template, an index of the template, or parameters used to generate the template (e.g., eye locations). Preferably, the embedder makes the digital watermark dependent on the image signature as described above and also includes this biometric information in the message payload. In this case, the image signature fuses the digital watermark to the photograph. The biometric information extracted from the message payload can be used for variety of authentication schemes, including, but not limited to: comparing embedded biometric information with biometric information derived from facial photo and/or captured from an image of the bearer's face at the time and place of authentication, using embedded biometric information to facilitate template generation, etc.

There are a number of ways in which the biometric information in the digital watermark can be used to enhance or facilitate biometric analysis. The machine readable information in the digital watermark can be used to facilitate or enhance the extraction of: (a) a biometric template directly from the printed photographic image (e.g., a "derived biometric"); (b) and/or to facilitate the comparison of a derived biometric template to another biometric derived from a live image or video of the bearer (1:1 verification); (c) and/or to a biometric template stored in a biometric database (one to many (1:N) verification).

An example of (a) would be a machine readable element conveying one or more parameters used in a biometric template, such as eye position in the photograph. Conveying this information in the document reduces or eliminates the processing resources required to locate the eye position, and enhances accuracy of the eye location process. In this case, the digital watermark payload includes biometric parameters, like eye, nose mouth locations, etc. These parameters may be hashed and/or stored in compressed form in the digital watermark payload.

An example of (b) is to include biometric parameters like eye position, in addition to biometric image calibration information, such as contrast range, image size, resolution or spatial scaling, the profile and illumination of the subject. This information may be included in the digital watermark or in a database referenced by the digital watermark. For facial biometrics, this type of information is used to process the facial image on the document, the live image of the bearer, or both. It is used to prepare the image for comparison with other biometric information in 1:1 or 1:N searches. Specifically, in the case of facial biometrics, it is used to extract the facial biometric template from the document image, live image of the bearer, or both, either by enabling the accurate extraction of biometric features, or by enabling the appropriate calibration of the biometric image so that more accurate extraction and comparison can be made based on that image.

An example of (c) is to include information in the watermark or database referenced by it to expedite searching of a 1:N biometric database through segmentation or "binning" of the information in the biometric database. Examples of this information include information used to segment a 1:N biometric database for improving search speed and accuracy for a particular template design, as well as other database segmentation information like the bearer's gender, eye color, hair color and/or other classification elements including "feature similarity" classifications, like those used in an "identikit." In the context of facial biometrics, identikit refers to a collection of facial features commonly used by law enforcement officers to construct an "artist sketch" of a suspect from witness description without the aid of a sketch artist. An identikit is sometimes represented in a fixed book format with banks of horizontal strips composing a face, each strip in the series representing an in-scale prototypical feature (e.g., eyes, nose, mouth, etc.). This type of format enables a user to manually select strips in different combinations until the composite best fits their descriptive memory of the suspect. Just as these features can be represented in a book, they can also be represented in an electronic library used in biometric template generation and searching. In the context of the electronic biometric database, these features may be used to group biometric data into bins that are searched when an input template is supplied that matches the bin category.

The information provided in the digital watermark code provides information that increases speed of the search and/or the search accuracy. For example, it can be used to narrow the search to a particle bin of biometric data in the database that matches the segmentation criteria. As such, it reduces search time by reducing the amount of data that needs to be evaluated or compared with the input biometric template, and eliminates portions of the database that might otherwise cause false matches.

All of the above approaches for enhancing template extraction and comparison can be improved in the context of photo identification documents by fusing the digital watermark with the image in which it is embedded using an image signature as described above. While the specific example refers to a digital watermark as the machine readable data carrier, other machine readable data carriers may be used as well.

Figure 4:
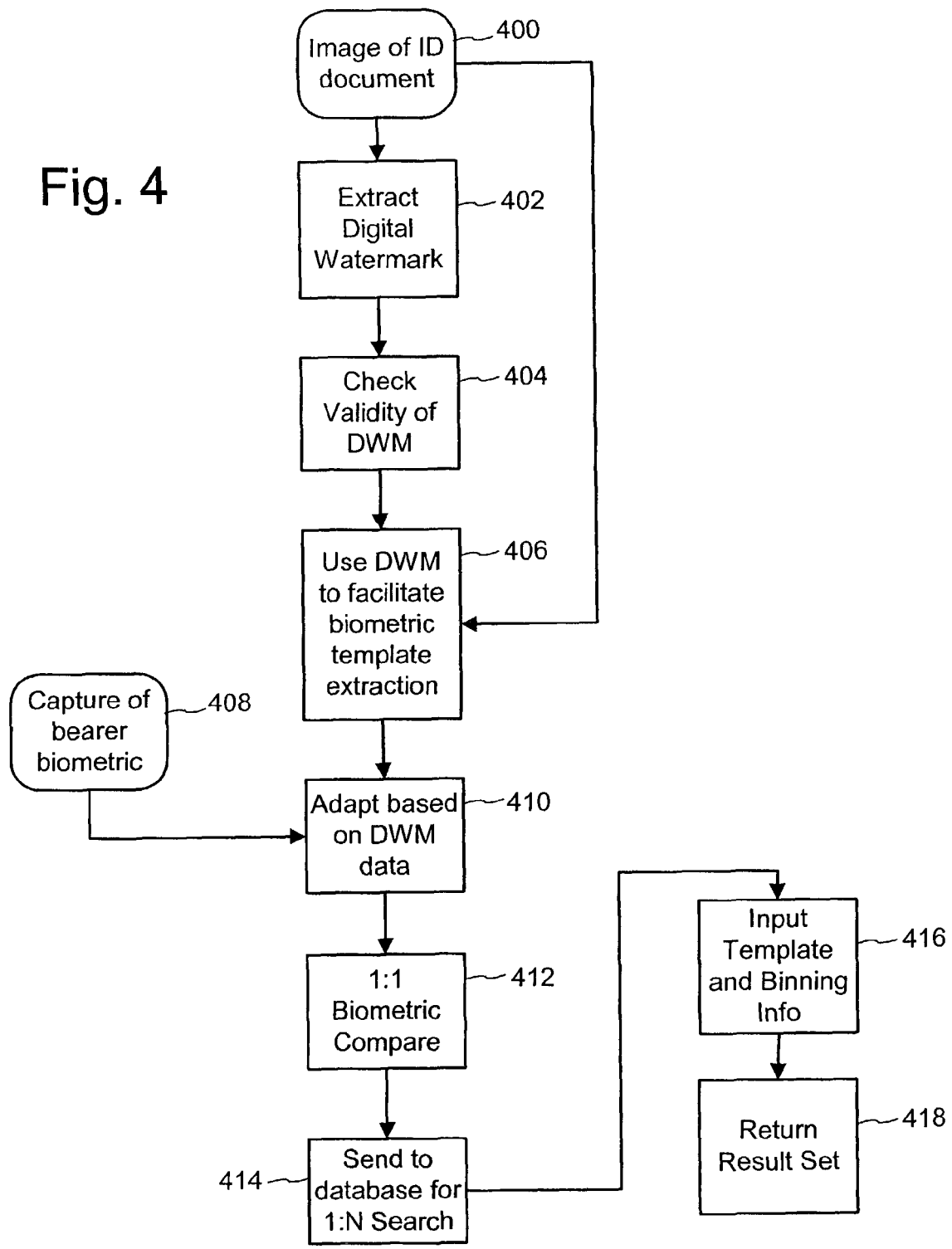
FIG. 4 is a flow diagram illustrating an example of a photo identification document verification process incorporating the use of machine readable information in the document to facilitate biometric verification.

FIG. 4 is a flow diagram illustrating an example of a photo identification document verification process incorporating the use of machine readable information in the document to facilitate biometric verification. The process begins with capture of an image of the photo ID document 400 via a card scanner or other imaging device. Next, a digital watermark reader in a reader system (e.g., programmed computer, hardware reader device, etc.) extracts the digital watermark 402 and uses the image signature to verify it as described above. Note that any of the digital watermark verification procedures described above may be used to verify the validity of the digital watermark at this stage.

Next, the biometric template extractor in the reader system generates a facial image template from the facial image on the document image using the digital watermark 406. The digital watermark (e.g., the calibration signal) may be used to locate the facial image and calibrate it to the proper scale. The payload of the watermark may also be used to help locate and verify salient features, such as eye coordinates, that form part of the template of the facial image.

In systems where 1:1 biometric verification is enabled, the system proceeds to a process for comparing the biometric template derived from the document image with biometric information captured from a live image 410 of the bearer. Parameters in the digital watermark may be used to facilitate this 1:1 biometric verification (as well as subsequent 1:N searching in a collection of biometric information). In addition to providing information for template generation as noted, the digital watermark may also provide information (or an index to a database entry with information) used to capture and adapt the image of the bearer's biometric 410. This information includes biometric image calibration information such as contrast range, color settings, illumination, image size and resolution settings, filter parameters (filter kernel parameters for edge detection), etc. This information allows biometric templates generated from two different sources, such as the facial photo on the document image and the live image of the bearer to be normalized relative to a particular standard protocol. It also enables the biometric templates to be normalized to the same protocol used in a 1:N database to which it may be compared.

To complete the 1:1 biometric verification, a biometric template analyzer compares the derived template from the document image with the biometric information from the live image of the bearer 412 to determine whether there is a match. The digital watermark may also be used to specify or adaptively determine the thresholds used to define whether there is a match.

The biometric information extracted from the document and the live image of the bearer may also be subjected to a 1:N search (e.g., to search for matches in a database of photo identification document holders). In this case, the reader system forwards the templates to a biometric database as shown in block 414 along with any information used to facilitate the search derived from the machine readable code on the document (in this case, the digital watermark), from information supplied by the user (e.g., such as user specific information like a pass code, etc.), and from information supplied by a system operator. At this stage, the template and corresponding search enhancement information is submitted to the biometric database search system 416, which in turn, provides a result set of candidate matches.

There are a variety of system configurations for performing biometric authentication in conjunction with ID document authentication. As noted above, biometric data on the ID document can be compared with biometric data captured from the bearer of the ID document at an authentication station (e.g., real time capture through a digital camera, scanner or other capture device). Also, biometric data on the ID document can be compared with information in a biometric database. This comparison may be one to one to confirm that the biometric data on the card matches with biometric data for the bearer of the document in the database. This comparison may also be one to many, where the search of the database attempts to identify all possible matches, which may indicate that the bearer has attempted to obtain more than one ID document fraudulently. In addition, the biometric data captured in real time from the bearer at an authentication station can be compared with one or more entries in a biometric database. This comparison includes either a one-to-one comparison with an entry in the database corresponding to the ID document, or a one-to-many comparison to identify all possible matches in the database.

While some of our examples specifically refer to facial images as the biometric data, the system can be adapted to additional types of biometric data including palm or fingerprints, iris or retina images, vein prints (e.g., vein location map of a human hand), handwritten signature information, voice signature information, etc. The biometric authentication process converts the captured biometric data, such as a facial image, fingerprint image, iris image or retinal image, into a template for comparison with one or more other biometric data sets or templates in a database. For a description of systems for performing biometric data classification (e.g., conversion to a template) and searching biometric databases, see U.S. Provisional Patent Application 60/451,840, entitled Integrating And Enhancing Searching Of Media Content And Biometric Databases, filed Mar. 3, 2003, by Kenneth L. Levy, which is hereby incorporated by reference.

The biometric verification need not be evaluated in every case; but instead, can be triggered if previous authentication metrics (such as those associated with the digital watermark) produce suspicious results. For additional information on performing biometric checks in connection with identification documents see co-pending U.S. Provisional application 60/418,129, filed Oct. 11, 2002 and entitled System And Methods For Recognition Of Individuals Using Combination Of Biometric Techniques, which is hereby incorporated by reference. See also, U.S. Provisional Application 60/456,677, which is hereby incorporated by reference.

ID cards can also be used in safeguarding a user's private (e.g., biometric) information. For example, in the above-cited patent application No. 60/344,682 titled "Biometric Identification System," filed Dec. 24, 2001, there is disclosed a biometric system for controlling access, verifying identity, etc. The system is based on the premise that an information carrier (e.g., a smart card) carries a user's biometric information, instead of storing biometric data in a central (and perhaps public or governmental) database. The user retains control over the card. Hence access to the user's biometric data is closely regulated.

There are alternative methods for safeguarding a user's biometric information, particularly if the biometric data is stored in a central or governmental location. For example, an identification card may include an embedded digital watermark having a payload. The payload includes an index which is used to interrogate a biometric database. The user's biometric data is stored in the database in an anonymous manner. In other words the only database user identification is the index and not the user's social security number, name and address. Access to the database is authorized by the user presenting the ID document for sampling. Privacy is enhanced by encrypting the index and/or by combining the index with user input such as a PIN/password. Further, consider an embedded digital watermark payload that includes a hash or other reduced-bit representation of a user's biometric data. For example, a retinal scan is reduced to a 32-256 bit hash. Or a user's thumbprint is processed to produce a hash. Still further, a DNA sample (or voice print, face recognition map, etc., etc.) can be represented by a hash or other reduced bit representation. The hash is included in the digital watermark payload (a "stored hash"). To verify identity, a biometric sample, e.g., a thumbprint, is taken from the user. The same (or complimentary) hashing algorithm is preformed on the biometric sample to produce a hash (a "sampled hash"). The payload is decoded from the embedded ID document to retrieve the stored hash. The stored hash is compare with the sampled hash to determine/verify identity. A user thereby retains control of her biometric data, without having to store the data in a centralized location. (The ID document preferably includes a fragile digital watermark to help prevent document tampering.). For more information see U.S. application Ser. No. 10/370,421, which is hereby incorporated by reference.

The digital watermark on an identification document can also cooperate with biometric information carried by the identification document. For example in one implementation, the digital watermark includes a payload having a key to decrypt or decode biometric information stored in a 2-D barcode or magnetic or RF storage carried on the card. In a second implementation, the digital watermark includes information that is redundant with biometric information carried by another security feature. Comparison of the digital watermark information and the biometric information is another way to determine whether the identification document is authentic. In a third implementation, the digital watermark includes at least a portion of a biometric template. Once decoded, the biometric template is used to help authenticate the identification document or to convey information as described above. For more information, see U.S. Provisional Application 60/421,254, which is hereby incorporated by reference.

The identification documents and other secure document types described above can be used in a variety of applications such as driver's licenses, access control cards, voter registration cards, national ID cards, travel documents, bank/debit/credit cards, membership cards, badges (including security and corporate). The term identification document is intended to cover a wide variety of such documents.

In some applications, other machine readable codes, such as bar codes, RF devices, smart cards, magnetic stripes or inks can be used in place of or in conjunction with digital watermarks.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for creating an identification credential having a biometric image, comprising:
   identifying a feature of the biometric image;
   generating a rectangular digital watermark signal tile; and
   embedding the digital watermark signal in the biometric image such that a location of a corner of the digital watermark signal tile is based at least in part on a location of the identified feature.

2. The method of claim 1 wherein the biometric image comprises a facial image.

3. A method for creating an identification credential having a biometric image, comprising:
   identifying a feature of the biometric image;
   generating a digital watermark signal; and
   embedding the digital watermark signal in the biometric image such that a location of the digital watermark is based at least in part on a location of the identified feature; wherein the digital watermark signal carries a variable message payload including, at least in part, information related to other information on the identification credential.

4. The method of claim 3 wherein the digital watermark carries an image signature derived from the biometric image.

5. A method for creating an identification credential having a facial image, comprising:
   identifying a feature of the facial image;
   generating a digital watermark signal;
   embedding the digital watermark signal in the facial image such that a location of the digital watermark is based at least in part on a location of the feature;
   dividing the facial image into tiles;
   calculating image signatures for two or more of the tiles; and
   embedding the image signatures in the two or more of the tiles.

6. The method of claim 5 wherein at least one tile boundary is based at least in part on the location of the feature.

7. A method for creating an identification credential having a biometric image, comprising:
- identifying a feature of the biometric image;
- generating a digital watermark signal;
- embedding the digital watermark signal in the biometric image such that a location of the digital watermark is based at least in part on a location of the identified feature;
- calculating two or more image signatures for portions of the biometric image that are based at least in part on symmetric properties of the biometric image; and
- embedding the two or more signatures in the biometric image.

8. A non-transitory computer readable medium on which is stored instructions comprising: instructions for identifying a feature of the biometric image;
- instructions for generating a rectangular digital watermark signal tile; and
- instructions for embedding the digital watermark signal in the biometric image such that a location of a corner of the digital watermark signal tile is based at least in part on a location of the identified feature.

9. A method of creating an identification credential having an image, the method comprising:
- generating a first digital watermark signal that carries a variable message payload including information related to information located on the identification credential separate from the image;
- generating a second digital watermark signal that carries an image signature of the image; and
- embedding the first and second digital watermark signals in the image.

10. The method of claim 9 wherein the image signature is derived from a frequency domain transform of the image.

11. The method of claim 10 wherein the signature is derived from a DCT transform of the image.

12. The method of claim 9 wherein the second digital watermark signal is based at least in part on the first digital watermark signal.

13. The method of claim 9 wherein the first and second digital watermark signals are generated by modulating a pseudorandom carrier signal.

14. The method of claim 9 wherein the image is divided into blocks, and each block is embedded with a first and second digital watermark signal.

15. The method of claim 9 wherein the identification credential is authenticated by comparing an image signature of the image with an image signature extracted from the second digital watermark signal.

16. The method of claim 9 wherein the variable message payload includes biometric information derived from the image.

17. The method of claim 16 wherein the image comprises a facial image and the biometric information includes facial biometric information derived from the facial image.

18. A non-transitory computer readable medium on which is stored instructions comprising: instructions for generating a first digital watermark signal that carries a variable message payload including information related to information located on the identification credential separate from the image;
- generating a second digital watermark signal that carries an image signature of the image; and
- instructions for embedding the first and second digital watermark signals in the image.

19. A method of creating an identification credential having a biometric image comprising:
- deriving biometric information from the biometric image;
- deriving an image signature that is separate from the biometric image;
- generating a variable digital watermark message including the biometric information; and
- embedding a digital watermark in the biometric image such that the digital watermark is based at least in part on the image signature and carries the variable digital watermark message.

20. The method of claim 19 wherein the biometric image comprises a facial image.

21. The method of claim 20 wherein the biometric information comprises information used to create a biometric template for facial recognition.

22. The method of claim 21 wherein the biometric information includes information about eye location.

23. A non-transitory computer readable medium on which is stored instructions comprising:
- instructions for deriving biometric information from the biometric image;
- instructions for deriving an image signature that is separate from the biometric image;
- instructions for generating a variable digital watermark message including the biometric information; and
- embedding a digital watermark in the biometric image such that the digital watermark is based at least in part on the image signature and carries the variable digital watermark message.

24. A method for creating an identification credential conveying biometric information, comprising:
- analyzing the biometric information to identify a feature on a host image therein;
- determining a current location of the feature;
- creating a coordinate system on the host image wherein the current location of the feature comprises a reference point for the coordinate system; and
- locating encoded information in the credential at a location based at least in part on the coordinate system.

25. A method for creating an identification credential conveying biometric information, comprising:
- analyzing the biometric information to identify a feature therein;
- determining a current location of the feature; and
- locating encoded information in the credential at a location based at least in part on the current location; wherein: the credential comprises an identification credential; the biometric information comprises a facial image; and the feature comprises a point at which a line passing through eyes in the image intersects with a line passing through a nose and a mouth in the image.

26. An identification credential comprising: encoded information at a location on a host image on the identification credential, wherein the location is based at least in part on a coordinate system, wherein a reference point for the coordinate system is based on a determined location of a feature, and wherein the feature is identified from a biometric information.

27. A method for creating an identification credential conveying biometric information, comprising:
- analyzing the biometric information to identify a feature on a host image therein;
- determining a current location of the feature;
- creating a coordinate system on the host image wherein the current location of the feature comprises a reference point for the coordinate system; and encoding data in the identification credential at a location based on the coordinate system.

28. A digital watermark embedder comprising:
a processor configured to:
identify a feature of a biometric image;
generate a rectangular digital watermark signal tile; and
embed a digital watermark signal in the biometric image such that a location of a corner of the digital watermark signal tile is based at least in part on a location of the feature.

29. A digital watermark embedder comprising:
a processor configured to:
identify a feature of a biometric image;
generate a digital watermark signal; and
embed the digital watermark signal in the biometric image such that a location of the digital watermark is based at least in part on a location of the feature; wherein the digital watermark signal carries a variable message payload including, at least in part, information related to other information on an identification credential.

30. A digital watermark embedder comprising:
a processor configured to:
identify a feature of a facial image to be placed on an identification credential;
divide the facial image into a plurality of tiles;
generate a digital watermark signal;
embed the digital watermark signal in the facial image such that a location of the digital watermark is based at least in part on a location of the feature;
calculate image signatures for two or more of the tiles; and
embed the image signatures in two or more of the tiles.

31. A digital watermark embedder comprising:
a processor configured to:
identify a feature of a biometric image to be placed on an identification credential;
generate a digital watermark signal;
embed the digital watermark signal in the biometric image such that a location of the digital watermark is based at least in part on a location of the identified feature;
calculate two or more image signatures for portions of the biometric image that are based at least in part on symmetric properties of the biometric image; and
embed the two or more signatures in the biometric image.

32. A digital watermark embedder comprising:
a processor configured to:
generate a first digital watermark signal that carries a variable message payload including information related to information located on an identification credential separate from an image on the identification credential;
generate a second digital watermark signal that carries an image signature of the image; and
embed the first and second digital watermark signals in the image.

33. A digital watermark embedder comprising:
a processor configured to:
derive biometric information from a biometric image on an identification credential;
derive an image signature that is separate from the biometric image;
generate a variable digital watermark message including the biometric information; and
embed a digital watermark in the biometric image such that the digital watermark is based at least in part on the image signature and carries the variable digital watermark message.

34. A digital watermark embedder comprising:
a processor configured to:
analyze a biometric information conveyed on an identification credential to identify a feature on a host image therein;
determine a location of the feature;
create a coordinate system on the host image wherein the location of the feature comprises a reference point for the coordinate system; and
locate encoded information in the credential at a location based at least in part on the coordinate system.

35. A digital watermark embedder comprising:
a processor configured to:
analyze a biometric information conveyed on an identification credential to identify a feature therein;
determine a current location of the feature; and
locate encoded information in the credential at a location based at least in part on the current location, wherein the credential comprises an identification credential, wherein the biometric information comprises a facial image, and wherein the feature comprises a point at which a line passing through eyes in the image intersects with a line passing through a nose and a mouth in the image.

36. A digital watermark embedder comprising:
a processor configured to:
analyze a biometric information conveyed on an identification credential to identify a feature on a host image therein;
determine the location of the feature;
create a coordinate system on the host image wherein the location of the feature comprises a reference point for the coordinate system; and
encode data in the identification credential at a location based on the coordinate system.

37. A non-transitory computer readable medium on which is stored instructions comprising:
instructions for identifying a feature of a biometric image on an identification credential;
instructions for generating a digital watermark signal; and
instructions for embedding the digital watermark signal in the biometric image such that a location of the digital watermark is based at least in part on a location of the identified feature; wherein the digital watermark signal carries a variable message payload including, at least in part, information related to other information on the identification credential.

38. A non-transitory computer readable medium on which is stored instructions comprising:
instructions for identifying a feature of a facial image on an identification credential;
instructions for generating a digital watermark signal;
instructions for embedding the digital watermark signal in the facial image such that a location of the digital watermark is based at least in part on a location of the identified feature;
instructions for dividing the facial image into tiles;
instructions for calculating image signatures for two or more of the tiles; and
instructions for embedding the image signatures in two or more of the tiles.

39. A non-transitory computer readable medium on which is stored instructions comprising:
instructions for identifying a feature of a biometric image on an identification credential;
instructions for generating a digital watermark signal;

instructions for embedding the digital watermark signal in the biometric image such that a location of the digital watermark is based at least in part on a location of the identified feature; instructions for calculating two or more image signatures for portions of the biometric image that are based at least in part on symmetric properties of the biometric image; and instructions for embedding the two or more signatures in the biometric image.

40. A non-transitory computer readable medium on which is stored instructions comprising:

instructions for analyzing a biometric information on an identification credential to identify a feature on a host image therein;

instructions for determining a current location of the feature;

instructions for creating a coordinate system on the host image wherein the current location of the feature comprises a reference point for the coordinate system; and instructions for locating encoded information in the credential at a location based at least in part on the coordinate system.

41. A non-transitory computer readable medium on which is stored instructions comprising instructions for analyzing a biometric information on an identification credential to identify a feature therein;

instructions for determining a current location of the feature; and instructions for locating encoded information in the credential at a location based at least in part on the current location; wherein: the credential comprises an identification credential; the biometric information comprises a facial image; and the feature comprises a point at which a line passing through eyes in the image intersects with a line passing through a nose and a mouth in the image.

42. A non-transitory computer readable medium on which is stored instructions comprising:

instructions for analyzing a biometric information to be embedded on an identification credential to identify a feature on a host image therein;

instructions for determining a current location of the feature;

instructions for creating a coordinate system on the host image wherein the current location of the feature comprises a reference point for the coordinate system; and instructions for encoding data in the identification credential at a location based on the coordinate system.

* * * * *

UNITED STATES PATENT AND TRADEMARK OFFICE
CERTIFICATE OF CORRECTION

| | | |
|---|---|---|
| PATENT NO. | : 8,190,901 B2 | Page 1 of 1 |
| APPLICATION NO. | : 10/449827 | |
| DATED | : May 29, 2012 | |
| INVENTOR(S) | : Barr et al. | |

It is certified that error appears in the above-identified patent and that said Letters Patent is hereby corrected as shown below:

On the Title Page, item (75), under "Inventors", in Column 1, Line 5, delete "Fort Meyers," and insert -- Fort Myers, --, therefor.

In the Specifications

In Column 4, Line 55, delete "etc" and insert -- etc. --, therefor.

In Column 5, Line 47, delete "anther" and insert -- another --, therefor.

In the Claims

In Column 17, Line 24, in Claim 8, delete "digit al" and insert -- digital --, therefor.

In Column 21, Line 25, in Claim 41, delete "comprising" and insert -- comprising: --, therefor.

Signed and Sealed this
Ninth Day of April, 2013

Teresa Stanek Rea
*Acting Director of the United States Patent and Trademark Office*